(12) United States Patent
Morioka

(10) Patent No.: US 12,403,585 B2
(45) Date of Patent: Sep. 2, 2025

(54) ROBOT SYSTEM

(71) Applicant: FANUC CORPORATION, Yamanashi (JP)

(72) Inventor: Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 533 days.

(21) Appl. No.: 17/916,661

(22) PCT Filed: May 20, 2021

(86) PCT No.: PCT/JP2021/019187
§ 371 (c)(1),
(2) Date: Oct. 3, 2022

(87) PCT Pub. No.: WO2021/235520
PCT Pub. Date: Nov. 25, 2021

(65) Prior Publication Data
US 2023/0150112 A1    May 18, 2023

(30) Foreign Application Priority Data

May 22, 2020  (JP) ................................ 2020-089282

(51) Int. Cl.
*B25J 5/00* (2006.01)
*B25J 9/16* (2006.01)
*B25J 13/08* (2006.01)

(52) U.S. Cl.
CPC .............. *B25J 5/007* (2013.01); *B25J 9/162* (2013.01); *B25J 9/1674* (2013.01); *B25J 13/085* (2013.01);
(Continued)

(58) Field of Classification Search
CPC . B60J 5/007; B60J 9/162; B60J 13/085; B60J 9/1674; G05B 2219/40298; G05B 2219/40599
See application file for complete search history.

(56) References Cited

U.S. PATENT DOCUMENTS 4,657,104 A * 4/1987 Holland .............. B60B 33/0057
180/211
8,930,019 B2 * 1/2015 Allen ..................... B25J 13/006
700/250
(Continued)

FOREIGN PATENT DOCUMENTS

CN  109454616 A  *  3/2019
JP  S61127597 A     6/1986
(Continued)

OTHER PUBLICATIONS

International Search Report dated Jul. 13, 2021, for International Patent Application No. PCT/JP2021/019187.
(Continued)

*Primary Examiner* — Timothy Wilhelm
(74) *Attorney, Agent, or Firm* — KARCESKI IP LAW, PLLC

(57) ABSTRACT

A robot system includes a robot and a controller that controls the robot. The robot includes a wheeled platform and a manipulator mounted on the wheeled platform. The manipulator includes a sensor that detects a force or a moment that acts on at least one joint. The controller controls at least one of the manipulator and the wheeled platform on the basis of the force or moment detected by the sensor so that a moment acting on the wheeled platform does not exceed a tip-over moment.

8 Claims, 6 Drawing Sheets

(52) U.S. Cl.
CPC .............. *G05B 2219/40298* (2013.01); *G05B 2219/40599* (2013.01)

(56) References Cited

U.S. PATENT DOCUMENTS

| | | | | |
|---|---|---|---|---|
| 8,942,846 B2* | 1/2015 | Jacobsen | ................ | B25J 9/0084 |
| | | | | 700/262 |
| 9,014,848 B2* | 4/2015 | Farlow | .................. | B25J 19/023 |
| | | | | 701/25 |
| 9,381,641 B2* | 7/2016 | Takahashi | ............. | B25J 9/1692 |
| 9,615,883 B2* | 4/2017 | Schena | ................. | A61B 50/13 |
| 10,493,617 B1* | 12/2019 | Holson | ................... | B25J 5/007 |
| 11,534,915 B1* | 12/2022 | Alspaugh | ............. | B25J 13/082 |
| 11,618,163 B2* | 4/2023 | Nakayama | ............. | B25J 9/1633 |
| | | | | 700/258 |
| 11,701,780 B2* | 7/2023 | Hiraide | ................... | B25J 9/162 |
| | | | | 700/254 |
| 11,745,331 B2* | 9/2023 | Smith | .................... | B25J 13/085 |
| | | | | 414/6 |
| 11,794,345 B2* | 10/2023 | Smith | .................... | B25J 9/0006 |
| 2015/0250547 A1* | 9/2015 | Fukushima | .............. | A61B 1/04 |
| | | | | 606/130 |
| 2017/0266811 A1* | 9/2017 | Ogawara | ................ | B25J 9/1633 |
| 2019/0351556 A1* | 11/2019 | Noda | ......................... | B25J 9/06 |

FOREIGN PATENT DOCUMENTS

| | | |
|---|---|---|
| JP | H054177 A | 1/1993 |
| JP | 2006026828 A | 2/2006 |
| JP | 2006150567 A | 6/2006 |
| JP | 2013094934 A | 5/2013 |
| JP | 2013094935 A | 5/2013 |

OTHER PUBLICATIONS

Chinese Office Action dated Jan. 17, 2025, for Chinese Patent Application No. 202180031117.4.

* cited by examiner

ROBOT SYSTEM

CROSS-REFERENCE TO RELATED APPLICATION(S)

This is a National Stage Entry into the United States Patent and Trademark Office from International Patent Application No. PCT/JP2021/019187, filed on May 20, 2021, which claims priority to Japanese Patent Application No. 2020-089282, filed on May 22, 2020, the entire contents of both of which are incorporated herein by reference.

FIELD OF THE INVENTION

The present disclosure relates to a robot system.

BACKGROUND OF THE INVENTION

Wheeled mobile robots having manipulators mounted on wheeled platforms are known (for example, see Japanese Unexamined Patent Application, Publication No. 2006-150567).

Japanese Unexamined Patent Application, Publication No. 2006-150567 describes that a target change in ZMP is set on the basis of an actual ZMP determined on the basis of the behavior of a platform-mounted robot and the ZMP limit value at which the standing state of the platform-mounted robot becomes unstable.

SUMMARY OF THE INVENTION

According to an aspect of the present disclosure, there is provided a robot system including a robot and a controller that controls the robot, in which the robot includes a wheeled platform and a manipulator mounted on the wheeled platform, the manipulator includes a sensor that detects a force or a moment that acts on at least one joint, and the controller controls at least one of the manipulator and the wheeled platform on the basis of the force or moment detected by the sensor so that a moment acting on the wheeled platform does not exceed a tip-over moment.

DESCRIPTION OF EMBODIMENT(S) OF THE INVENTION

A robot system 1 according to one embodiment of the present disclosure will now be described with reference to the drawings.

Figure 1:
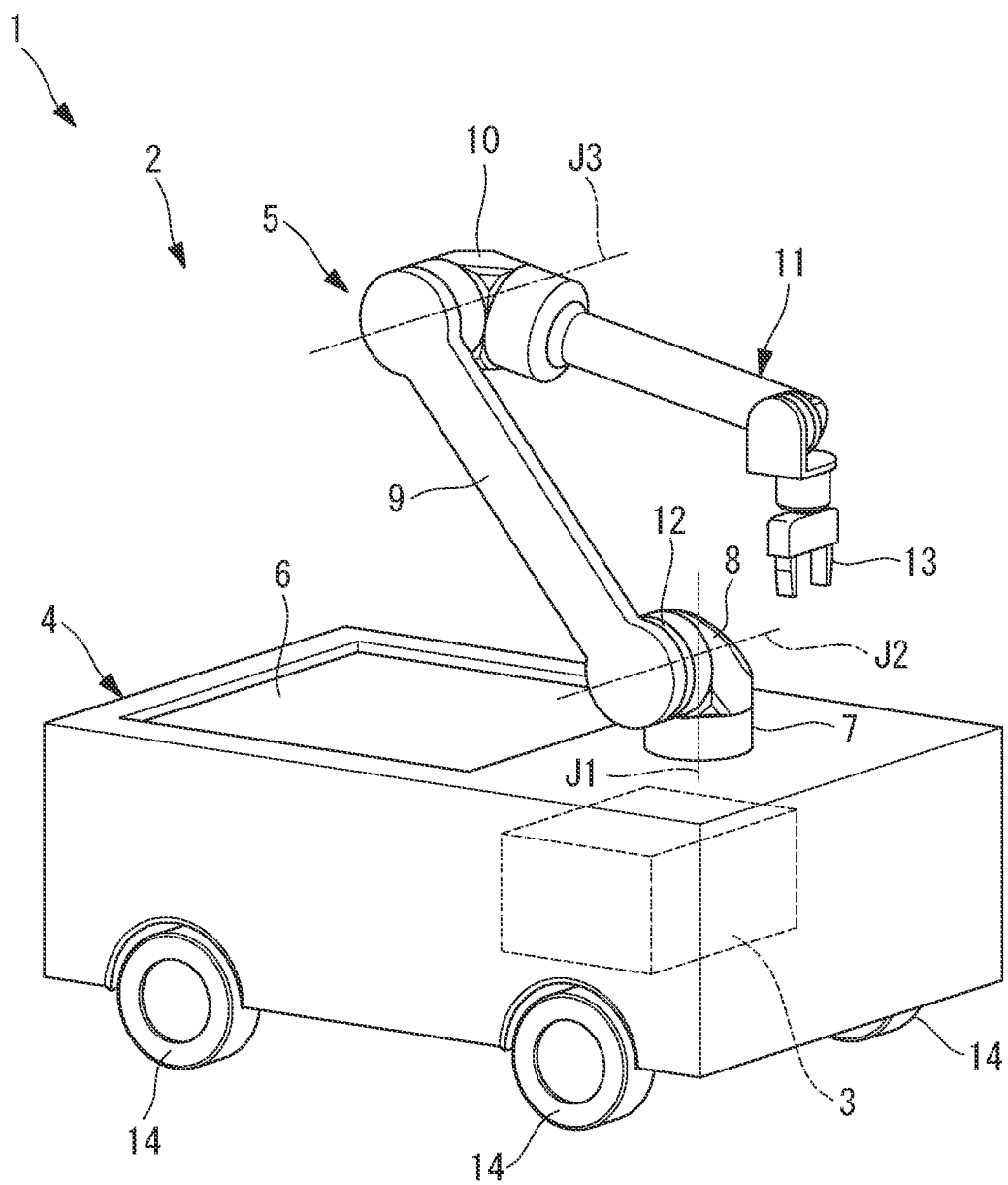
FIG. 1 is a perspective view illustrating a robot system according to one embodiment of the present disclosure.
Figure 2:
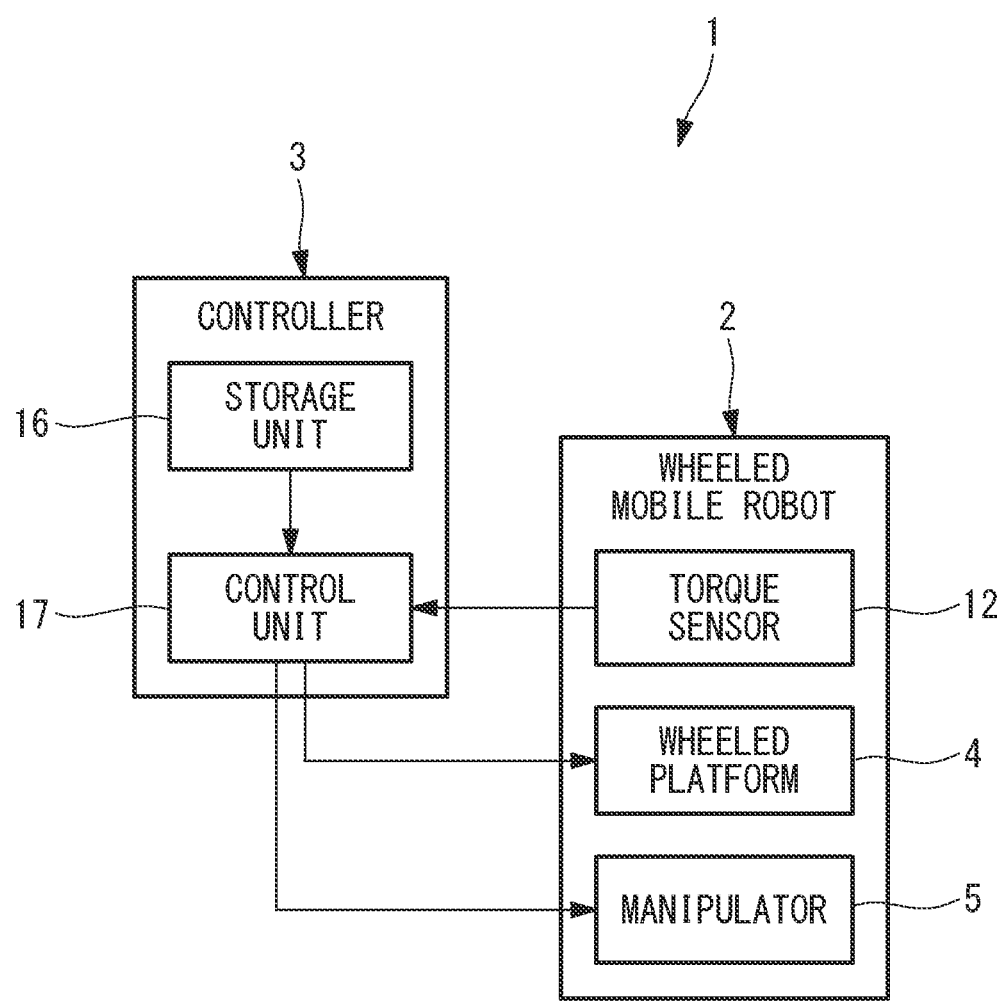
FIG. 2 is a block diagram illustrating the robot system illustrated in FIG. 1.

As illustrated in FIGS. 1 and 2, the robot system 1 of this embodiment includes a wheeled mobile robot (robot) 2 and a controller 3 that controls the wheeled mobile robot 2. The controller 3 is built into the wheeled mobile robot 2, for example.

The wheeled mobile robot 2 includes an automated or hand-pushed wheeled platform 4 that can travel on a road surface, and a manipulator 5 mounted on the wheeled platform 4.

The wheeled platform 4 is, for example, a four-wheeled vehicle having a top surface having the manipulator 5 mounted thereon and a stage 6 that holds workpieces and the like within the motion range of the manipulator 5. In the drawings, reference sign 14 denotes wheels of the wheeled platform 4.

The manipulator 5 includes a base 7 fixed to the upper surface of the wheeled platform 4, and a rotary barrel 8 rotatably supported about a vertical first axis J1 with respect to the base 7. The manipulator 5 is also includes a first arm 9 rotatably supported about a horizontal second axis J2 with respect to the rotary barrel 8, a second arm 10 rotatably supported about a third axis J3 parallel to the second axis J2 with respect to the first arm 9, and a three-axis wrist unit 11 at a tip of the second arm 10. The manipulator 5 is not limited to the vertical articulated type, and may be of any type such as a horizontal articulated type or a linear motion type.

As illustrated in FIG. 1, a torque sensor (sensor) 12 that detects the moment about the second axis J2 is installed in the first arm 9 in the vicinity of the second axis J2. The torque sensor 12 that detects the moment about the second axis J2 can directly detect the moment acting on the wheeled platform 4 from the manipulator 5.

A hand 13 that grips the workpiece (not illustrated) is attached to the tip of the wrist unit 11.

The controller 3 includes a storage unit 16 that stores a program etc., and a control unit 17 that controls the manipulator 5 according to the program stored in the storage unit 16. The storage unit 16 is constituted of a memory, and the control unit 17 is constituted of a processor and a memory.

The controller 3 receives the moment about the second axis J2 detected by the torque sensor 12 and controls the manipulator 5 such that the detected moment does not exceed the tip-over moment Ma at each of the positions of the manipulator 5 in operation relative to the wheeled platform 4.

The tip-over moment Ma is a moment that acts on the wheeled platform 4 from the manipulator 5, and is a limit value at which the wheeled platform 4 tips over. The tip-over moment Ma is stored in the storage unit 16 in advance in accordance with the angle θ1 of the rotary barrel 8 about the first axis J1 with respect to the base 7.

Figure 3:
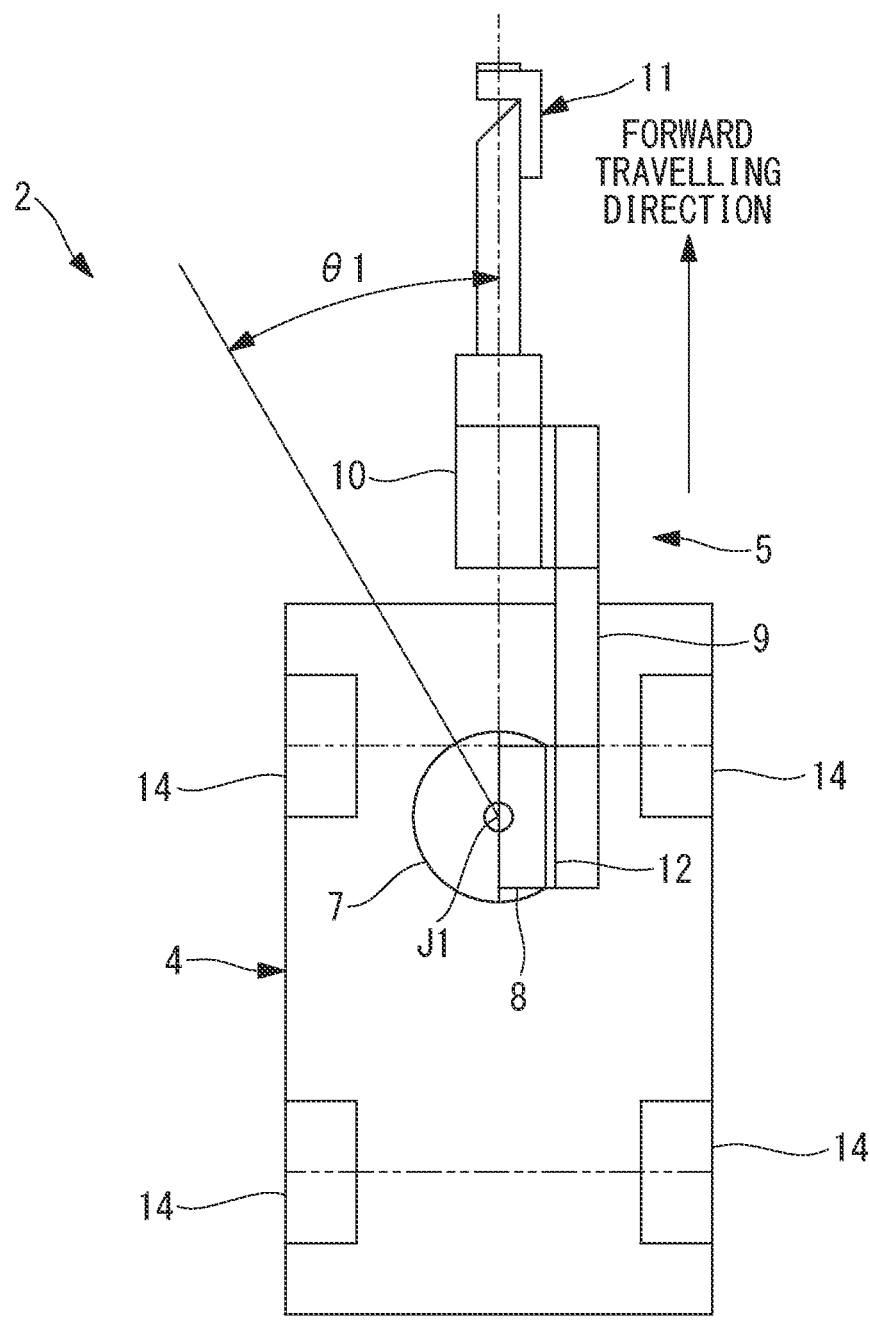
FIG. 3 is a plan view of a wheeled mobile robot in the robot system illustrated in FIG. 1.
Figure 4:
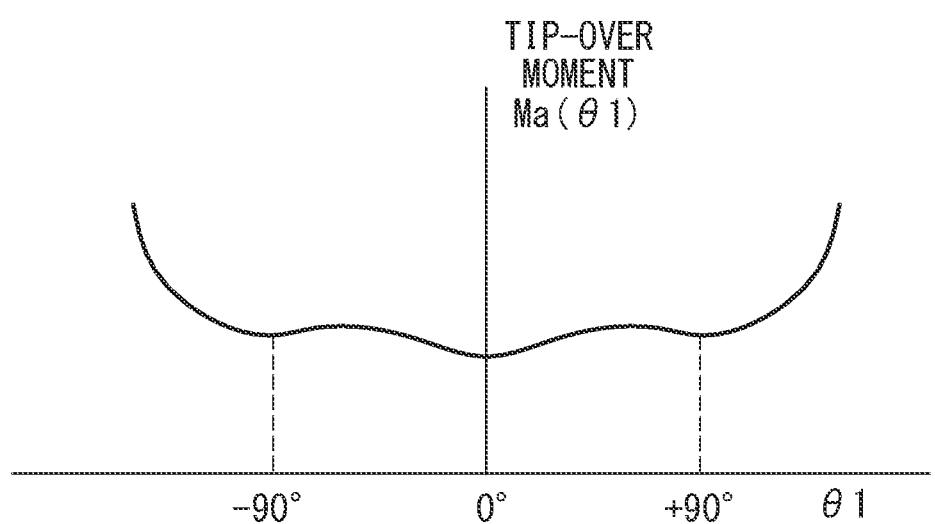
FIG. 4 is a graph illustrating one example of the relationship between the tip-over moment and the angle of a rotary barrel of the wheeled mobile robot in the robot system illustrated in FIG. 1.

For example, as illustrated in FIGS. 1 and 3, when the wheeled platform 4 has four wheels 14 and the first axis J1 lies at the center between left and right wheels and at a position closer to the front wheels 14 than the rear wheels 14, the tip-over moment Ma changes according to the angle θ1, as illustrated in FIG. 4.

Figure 5:
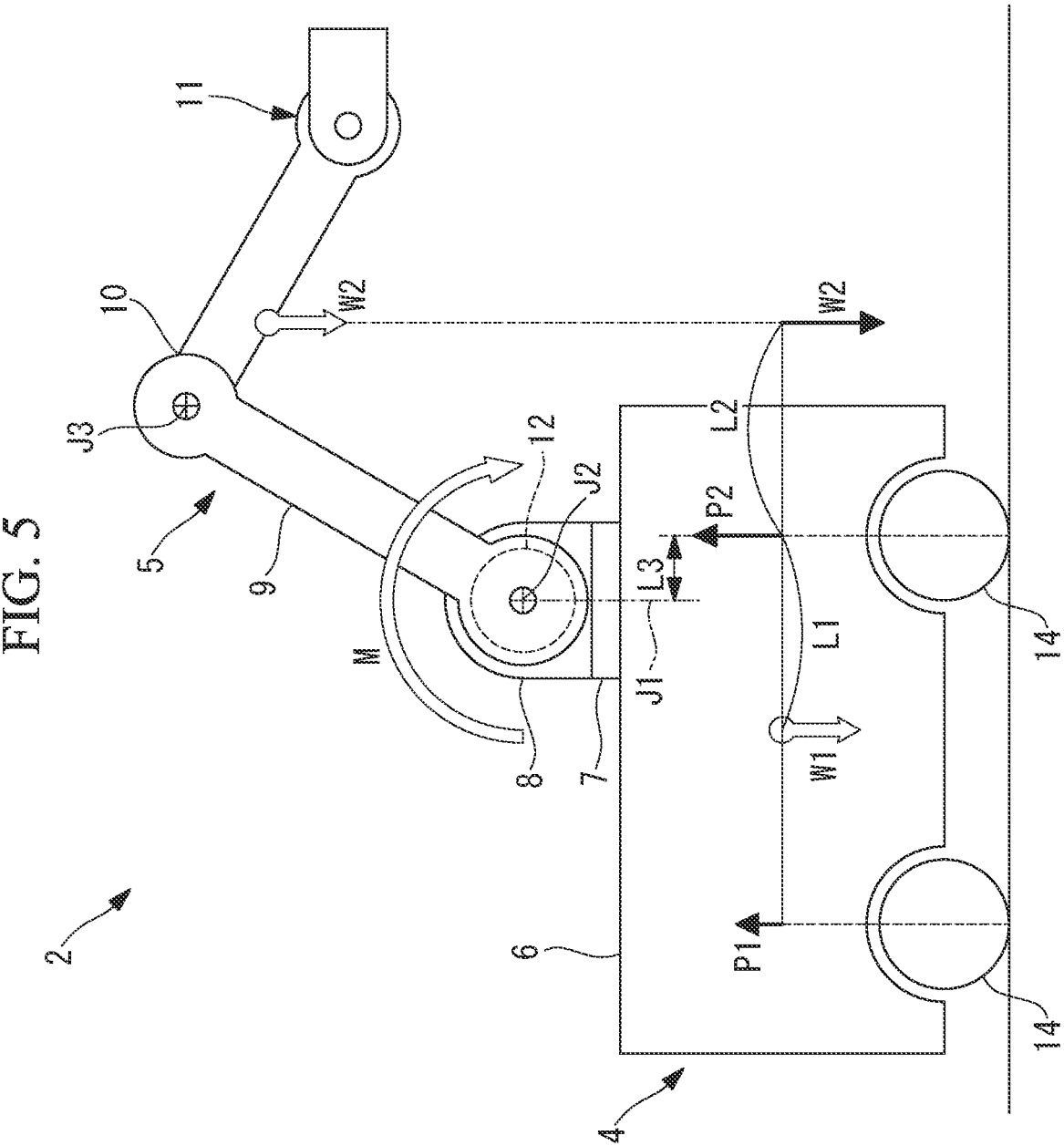
FIG. 5 is a side view illustrating moments acting on individual parts when the angle θ1 of the rotary barrel of the wheeled mobile robot illustrated in FIG. 3 is 0°.

In addition, for example, as illustrated in FIG. 5, when the rotary barrel 8 of the manipulator 5 lies at the origin position (θ1=0°) to face the forward traveling direction of the wheeled platform 4 relative to the base 7, the conditions for the static tip-over of the wheeled platform 4 are as expressed by the following formula (1).

$$L1 \times W1 < L2 \times W2 \qquad (1)$$

where

W1 represents the mass of the wheeled platform 4,

L1 represents the distance from the center of the front wheels of the wheeled platform 4 to the center of gravity of the wheeled platform 4, W2 represents the mass of the manipulator 5, the hand 13, and the workpiece, and L2 represents the distance from the center of the front wheels of the wheeled platform 4 to the center of gravity of the manipulator 5, the hand 13, and the workpiece in total.

The masses W1 and W2 and the distance L1 are known values.

The distance L2, which is determined by the orientation of the manipulator 5, can be calculated from the following formula (2) by using the moment M about the first axis J1 detected by the torque sensor 12.

$$M = (L2 + L3) \times W2 \quad (2)$$

where L3 represents the distance from the center of the front wheels of the wheeled platform 4 to the first axis J1, and is a known value.

Rearranging formula (1) by using formula (2) gives the following formulae (3) and (4):

$$L1 \times W1 < (M/W2 - L3) \times W2 \quad (3)$$

$$M > L1 \times W1 + L3 \times W2 = Ma(\theta 1) \quad (4)$$

where $Ma(\theta 1)$ represents the tip-over moment, which changes according to the angle $\theta 1$.

In other words, when the moment M on the left side of formula (4) exceeds the tip-over moment $Ma(\theta 1)$ on the right side, the wheeled platform 4 tips over.

The controller 3 calculates the differential moment, which is the difference between the moment M detected by the torque sensor 12 and the tip-over moment Ma, for each of the positions of the manipulator 5.

Generally, the manipulator 5 is designed to operate throughout its motion range without causing tip-over of the wheeled platform 4 since the tip-over conditions expressed in formula (4) will not be satisfied as long as the manipulator 5 grips a workpiece having a rated mass or less. However, there may be cases where the rated mass of the workpiece to be handled needs to be increased even if this requires limiting the motion range of the manipulator 5, and tip-over of the wheeled platform 4 must be considered in such cases.

The situations where the wheeled platform 4 tips over are as follows.

First, for example, when the first arm 9 and the second arm 10 are extended in the forward travelling direction of the wheeled platform 4 while the hand 13 is gripping a heavy workpiece, the conditions approach the tip-over conditions expressed in formula (4), eventually reaching a zero differential moment at some time point and thereby causing the wheeled platform 4 to tip over. In order to avoid the tip-over in this case, the controller 3 de-actuates the manipulator 5 before the tip-over conditions expressed in formula (4) are satisfied.

Second, when the manipulator 5 moving in a direction approaching the tip-over conditions expressed in formula (4) is decelerated to make a stop, a counterforce torque equal to the deceleration torque is added, and this rapidly increases the moment acting on the wheeled platform 4, thereby satisfying the tip-over conditions expressed in formula (4).

In order to avoid the tip-over in this case, the controller 3 decelerates the motion of the manipulator 5 when the differential moment calculated at each of the positions of the manipulator 5 in operation relative to the wheeled platform 4 reaches a predetermined value.

The largest deceleration torque is generated in the event of an emergency stop during operation of the manipulator 5; thus, the predetermined value is preferably set to a value equal to or higher than the deceleration torque needed for the emergency stop.

The deceleration torque needed for the emergency stop differs depending on the motion speed of the manipulator 5, and thus is calculated on the basis of the motion speed at each position.

When the manipulator 5 is traveling in a direction approaching the tip-over conditions expressed in formula (4), decreasing the speed at a deceleration smaller than that for the emergency stop causes the conditions to further approach the tip-over conditions; however, decreasing the speed decreases the deceleration torque needed for the emergency stop. Thus, the manipulator 5 can be operated while maintaining the state in which the tip-over conditions expressed in formula (4) are not satisfied, and even if an emergency stop command is output, the wheeled platform 4 does not tip over.

Third, the tip-over conditions expressed in formula (4) may be satisfied by a moment that dynamically occurs due to a counterforce generated by the manipulator 5 accelerating on any one axis.

For example, at the position illustrated in FIG. 5, even when the tip-over conditions expressed in formula (4) are not satisfied, accelerating the first arm 9 counterclockwise about the second axis J2 may cause a clockwise counterforce torque to act on the wheeled platform 4. As a result, the tip-over conditions expressed in formula (4) become satisfied, and the wheeled platform 4 may tip-over. In such a case, the controller 3 limits the magnitude of the counterclockwise acceleration of the first arm 9.

As described above, according to the robot system 1 of this embodiment, the moment acting on the wheeled platform 4 is detected by the torque sensor 12 installed in the manipulator 5, and the controller 3 controls the manipulator 5 to remain in a state where the detected moment does not exceed the tip-over moment Ma. This provides an advantage in that the manipulator 5 can be operated without causing the wheeled platform 4 to tip over while the wheeled platform 4 is at a stop.

Note that, in this embodiment, an example in which the tip-over of the wheeled platform 4 is prevented by adjusting the motion speed or the acceleration/deceleration speed without changing the operation locus of the manipulator 5 on the basis of the operation command is described. Alternatively, the tip-over of the wheeled platform 4 may be prevented by changing the operation locus of the manipulator 5 on the basis of the operation command.

Figure 6:
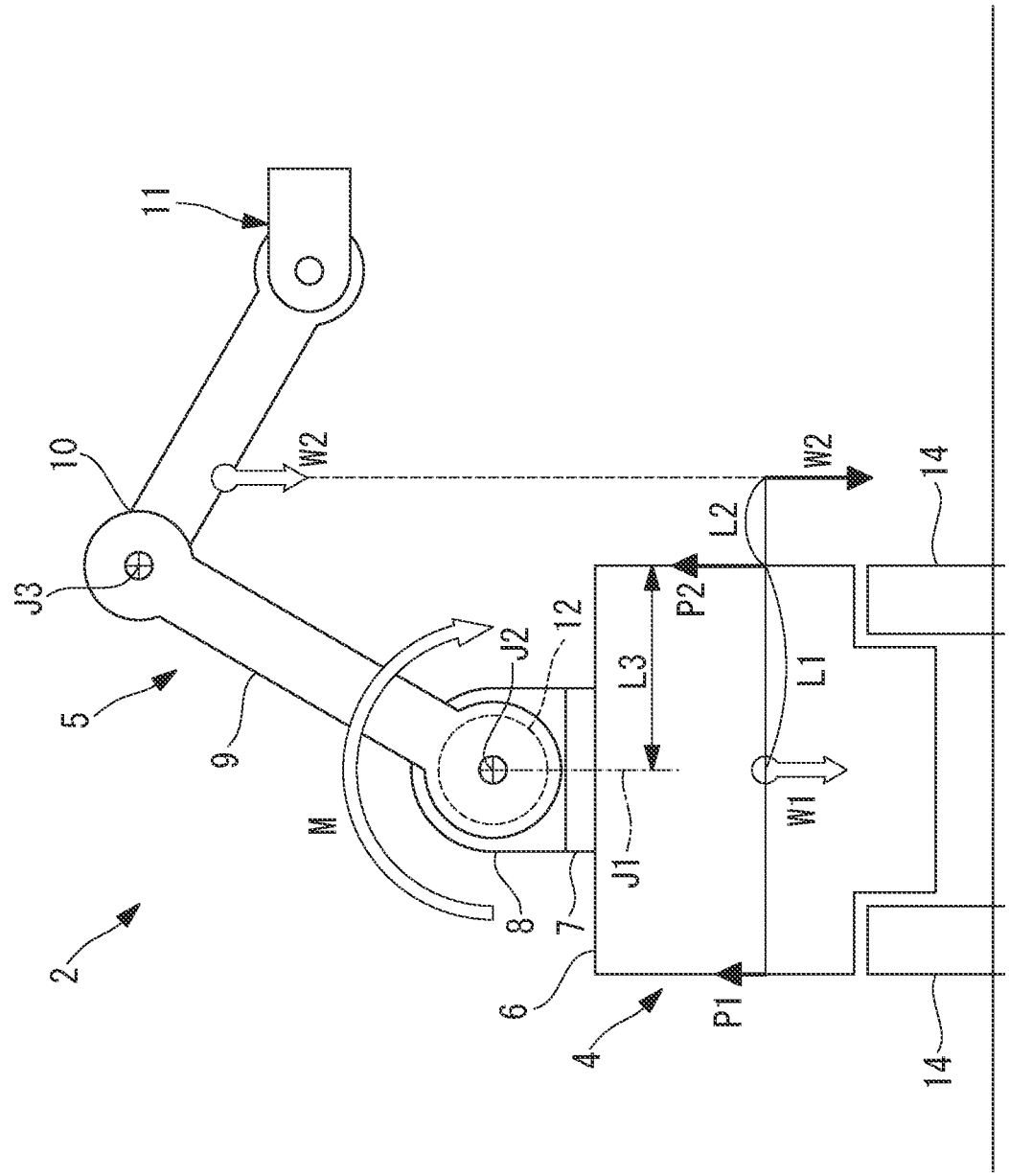
FIG. 6 is a front view illustrating moments acting on individual parts when the angle θ1 of the rotary barrel of the wheeled mobile robot illustrated in FIG. 3 is 90°.

For example, as described above, the tip-over moment Ma of the wheeled platform 4 changes according to the angle $\theta 1$ of the rotary barrel 8 about the first axis J1. In the case illustrated in FIG. 4, the tip-over moment Ma is the smallest at an angle $\theta 1 = 0°$, and thus, the possibility of the tip-over is higher in the case illustrated in FIG. 5 where $\theta 1 = 0°$ than in the case illustrated in FIG. 6 where $\theta 1 = 90°$. Thus, the rotary barrel 8 may be rotated to an angle $\theta 1$ that yields a larger tip-over moment Ma when the moment detected by the torque sensor 12 at each of the positions of the operating manipulator 5 is close to the tip-over moment Ma at the angle $\theta 1$ at that point in time.

In addition, for example, when the wheeled platform 4 is autonomous and when the first arm 9 is rotating clockwise in FIG. 5, the controller 3 may control the wheeled platform 4 to accelerate in the forward direction if deceleration of the first arm 9 causes the wheeled platform 4 to tip over forward. In this manner, the moment that acts on the wheeled platform 4 from the manipulator 5 can be reduced, and thus tip-over of the wheeled platform 4 can be prevented.

In addition, when the first arm 9 is rotating clockwise in FIG. 5 and decelerating the first arm 9 would cause the wheeled platform 4 to tip over forward, the second arm 10 may be accelerated clockwise about the third axis J3 with respect to the first arm 9.

In this case also, the moment acting on the wheeled platform 4 from the manipulator 5 can be reduced by bringing the position of the center of gravity of the manipulator 5 close to the second axis J2, and the moment can be reduced by generating a counterforce torque in the first arm 9 by accelerating the second arm 10.

When the rotary barrel 8 is rotated or the second arm 10 is rotated, this operation is not the operation of the manipulator 5 on the basis of the motion command, and thus it is necessary to ensure that no interference occurs between the wheeled mobile robot 2 and the peripheral equipment.

Furthermore, in this embodiment, the torque sensor 12 that detects the moment about the second axis J2 is provided in the first arm 9; alternatively, the torque sensor 12 may be built into the rotary barrel 8 or the base 7, or may be disposed between the wheeled platform 4 and the base 7. Alternatively, a force sensor or torque sensor such as an acceleration sensor that detects the force or moment acting on at least one joint may be employed.

In this embodiment, the case in which the manipulator 5 is controlled to prevent tip-over of the wheeled platform 4 when the manipulator 5 is actuated while the wheeled platform 4 is at a stop is described. Alternatively, these features may be applied to cases where the manipulator 5 is actuated while the wheeled platform 4 is moving. In such a case, the moment acting on the wheeled platform 4 due to the acceleration/deceleration speed of the wheeled platform 4 may be additionally considered.

The invention claimed is:

1. A robot system comprising:
a robot and a controller that controls the robot,
wherein the robot includes a wheeled platform and a manipulator mounted on the wheeled platform,
the manipulator includes a sensor that detects a force or a moment that acts on at least one joint,
the controller controls at least one of the manipulator and the wheeled platform on the basis of the force or moment detected by the sensor so that a moment acting on the wheeled platform does not exceed a tip-over moment,
the controller calculates a differential moment by subtracting the moment acting on the wheeled platform from the tip-over moment at each position of the manipulator in operation relative to the wheeled platform, and decelerates a motion of the manipulator when the differential moment reaches a predetermined value, and
the predetermined value is set to be larger than a deceleration torque needed for the manipulator to make an emergency stop at each position of the manipulator in operation relative to the wheeled platform.

2. The robot system according to claim 1, wherein the sensor detects a moment about a horizontal second axis.

3. The robot system according to claim 2, wherein the manipulator includes a first arm that is driven to rotate about the second axis with respect to the wheeled platform, and the sensor is disposed in a vicinity of the second axis.

4. A robot system comprising:
a robot and a controller that controls the robot,
wherein the robot includes a wheeled platform and a manipulator mounted on the wheeled platform,
the manipulator includes a sensor that detects a force or a moment that acts on at least one joint,
the controller controls at least one of the manipulator and the wheeled platform on the basis of the force or moment detected by the sensor so that a moment acting on the wheeled platform does not exceed a tip-over moment,
the manipulator includes a first arm that is driven to rotate about a horizontal second axis with respect to the wheeled platform, and
the controller calculates a differential moment by subtracting the moment acting on the wheeled platform from the tip-over moment at each position of the first arm in operation relative to the wheeled platform, and actuates the first arm at an acceleration speed smaller than the acceleration speed corresponding to the differential moment.

5. The robot system according to claim 4, wherein
the manipulator includes a second arm that is driven to rotate about a third axis parallel to the second axis with respect to the first arm, and
the controller actuates the second arm in a direction in which the moment detected by the sensor is decreased when the differential moment reaches a predetermined value.

6. The robot system according to claim 4, wherein
the manipulator includes a rotary barrel that is driven to rotate about a vertical first axis with respect to the wheeled platform, and
the first arm is driven to rotate about the second axis with respect to the rotary barrel.

7. The robot system according to claim 6, wherein, when the differential moment reaches a predetermined value, the controller actuates the rotary barrel in a direction in which the tip-over moment increases.

8. The robot system according to claim 6, wherein the sensor is a torque sensor that detects a torque about the first axis.

* * * * *